(12) United States Patent
Draznin

(10) Patent No.: US 9,100,804 B2
(45) Date of Patent: Aug. 4, 2015

(54) PROACTIVE DIAGNOSTICS

(71) Applicant: VERIZON PATENT AND LICENSING INC., Basking Ridge, NJ (US)

(72) Inventor: Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

(21) Appl. No.: 13/763,016

(22) Filed: Feb. 8, 2013

(65) Prior Publication Data

US 2014/0228061 A1    Aug. 14, 2014

(51) Int. Cl.
| | |
|---|---|
| *H04M 1/00* | (2006.01) |
| *H04W 4/12* | (2009.01) |
| *G01C 21/00* | (2006.01) |
| *G06F 3/048* | (2013.01) |
| *H04W 4/00* | (2009.01) |
| *H04L 12/18* | (2006.01) |
| *H04M 3/51* | (2006.01) |
| *H04W 4/04* | (2009.01) |
| *H04W 4/02* | (2009.01) |
| *H04W 8/18* | (2009.01) |

(52) U.S. Cl.
CPC .............. *H04W 4/12* (2013.01); *G01C 21/00* (2013.01); *G06F 3/048* (2013.01); *H04L 12/1895* (2013.01); *H04W 4/005* (2013.01); *H04M 3/5116* (2013.01); *H04M 2207/18* (2013.01); *H04M 2242/04* (2013.01); *H04W 4/027* (2013.01); *H04W 4/04* (2013.01); *H04W 4/046* (2013.01); *H04W 8/18* (2013.01)

(58) Field of Classification Search
CPC ..................... H04M 2207/18; H04M 2242/04; H04M 3/5116; H04W 4/027; H04W 4/04; H04W 4/005
USPC .............................. 455/418–42, 556.1; 701/2
See application file for complete search history.

(56) References Cited

U.S. PATENT DOCUMENTS 7,085,680 B2    8/2006 Huang
2011/0225096 A1*    9/2011 Cho et al. ...................... 705/305

(Continued)

OTHER PUBLICATIONS

Barclay., "The 'Smart Fridge' FindsThe Lost Lettuce, For a Price", May 4, 2012, http://www.npr.org/blogs/thesalt/2012/05/03/151968878/the-smart-fridge-finds-the-lost-lettuce-for-a-price.

(Continued)

*Primary Examiner* — Charles Appiah
*Assistant Examiner* — Jaime Holliday

(57) ABSTRACT

A data message is received from a machine-to-machine (M2M) device over a mobile communication network. The data message includes: a Machine Identification (MID) number of a machine coupled to the M2M device and/or an identifier of the M2M device; location information of the machine; and an alert based on a condition of the machine satisfying a service or alarm criterion. A database associated with the application server is searched for different solutions for the machine satisfying a service or alarm criterion. The machine is then matched with one or more providers that can service the machine for each solution. A tailored response data message, based on the machine location information, the identified condition and the matched provider(s), is sent to the user of the machine.

23 Claims, 8 Drawing Sheets

(56) References Cited

U.S. PATENT DOCUMENTS

| | | | |
|---|---|---|---|
| 2011/0320066 A1* | 12/2011 | Schofield et al. | 701/1 |
| 2012/0123629 A1* | 5/2012 | Edwards et al. | 701/29.1 |
| 2013/0218400 A1* | 8/2013 | Knoop et al. | 701/31.4 |
| 2014/0067902 A1* | 3/2014 | Wang et al. | 709/201 |
| 2014/0269283 A1* | 9/2014 | Shaheen | 370/230 |

OTHER PUBLICATIONS

App tells you when you're low on milk, Top News headlines, World News & U.S News—Upi.com, May 11, 2012.

OnStar., http://en.wikipedia.org/wiki/OnStar last updated Dec. 30, 2012.

* cited by examiner

| Sensor | Function to M2M Device |
|---|---|
| Air-fuel ratio meter | Indicates that air-fuel ratio is above or below predetermined thresholds |
| Engine coolant temperature sensor (ECT) sensor | Indicates excessive engine temperature |
| Pressure sensor | Monitors air pressure inside tire |
| Mass flow sensor, or mass airflow (MAF) sensor | Indicates whether there is not enough air entering the engine |
| Oxygen sensor | Monitors amount of oxygen in the exhaust |
| GPS | Correlates speed determined from GPS with spedometer and alerts when there is a discrepancy |
| Water sensor or water-in-fuel sensor | Determines the presence of water in fuel |
| Temperature sensor | Measures temparature of various components of the vehicle and alerts when above predetermined thresholds |
| Throttle position sensor | Monitors the position of the throttle in an internal combustion engine |
| Torque sensoror, torque transducer, or torquemeter | Measures torque (twisting force) on a rotating system |

*FIG. 2*

PROACTIVE DIAGNOSTICS

BACKGROUND

In recent years, there is a trend to use an increasing number of sensors to monitor the condition of a machine such as a vehicle or home appliance. The condition is then communicated to the user via a display on the machine or the user is alerted to further investigate the condition of the machine by taking the machine to or calling-in a specialist for service. For example, a sensor in the refrigerator may sense that the water filter is due for replacement. When a sensed condition satisfies a service or alarm criterion, an alert may be displayed as a message on a user interface (e.g., screen) or a light indicator (e.g., red/orange) on the front of the appliance. In another example, based on various sensors within a vehicle, an On Board Diagnostic (OBD) system provides the vehicle owner or a repair technician (e.g., via an OBD-II reader) access to state of health information for various vehicle sub-systems. Early instances of OBD would simply illuminate a malfunction indicator light (MIL) when a problem or potential for servicing was detected. However, such an indication would generally not provide any information as to the nature of the problem. More modern OBD implementations (e.g., OBD-II) use a standardized digital communications port to provide real-time data in addition to a standardized series of diagnostic trouble codes (DTC), which allow the service technician or user of the vehicle to look up the code to identify and remedy the malfunction.

Even when a user of a machine is alerted to a malfunction or service schedule, the options to service the machine may still not be clear to the user. For example, a user may not know the different possible solutions, cost involved, how long he or she can wait to service the machine, or which provider can provide products or services for the malfunction or service schedule. Even if the user would try to remedy the malfunction or service schedule (e.g., by taking the vehicle to a mechanic or soliciting a service provider to replace a filter on the refrigerator), the user may not be sure whether a fair price is charged, how long the procedure takes, etc. What is presently missing is immediate feedback with up to date information on the options faced by the user at their present location. Further, providers of service and/or parts do not have an effective way of communicating their schedule availability, price, location, and specials to potential customers in an efficient way.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 is a non-exhaustive table of an exemplary list of sensors that can be used with an M2M device to determine the health of a machine, which in the example is a vehicle.

DETAILED DESCRIPTION

Figure 1:
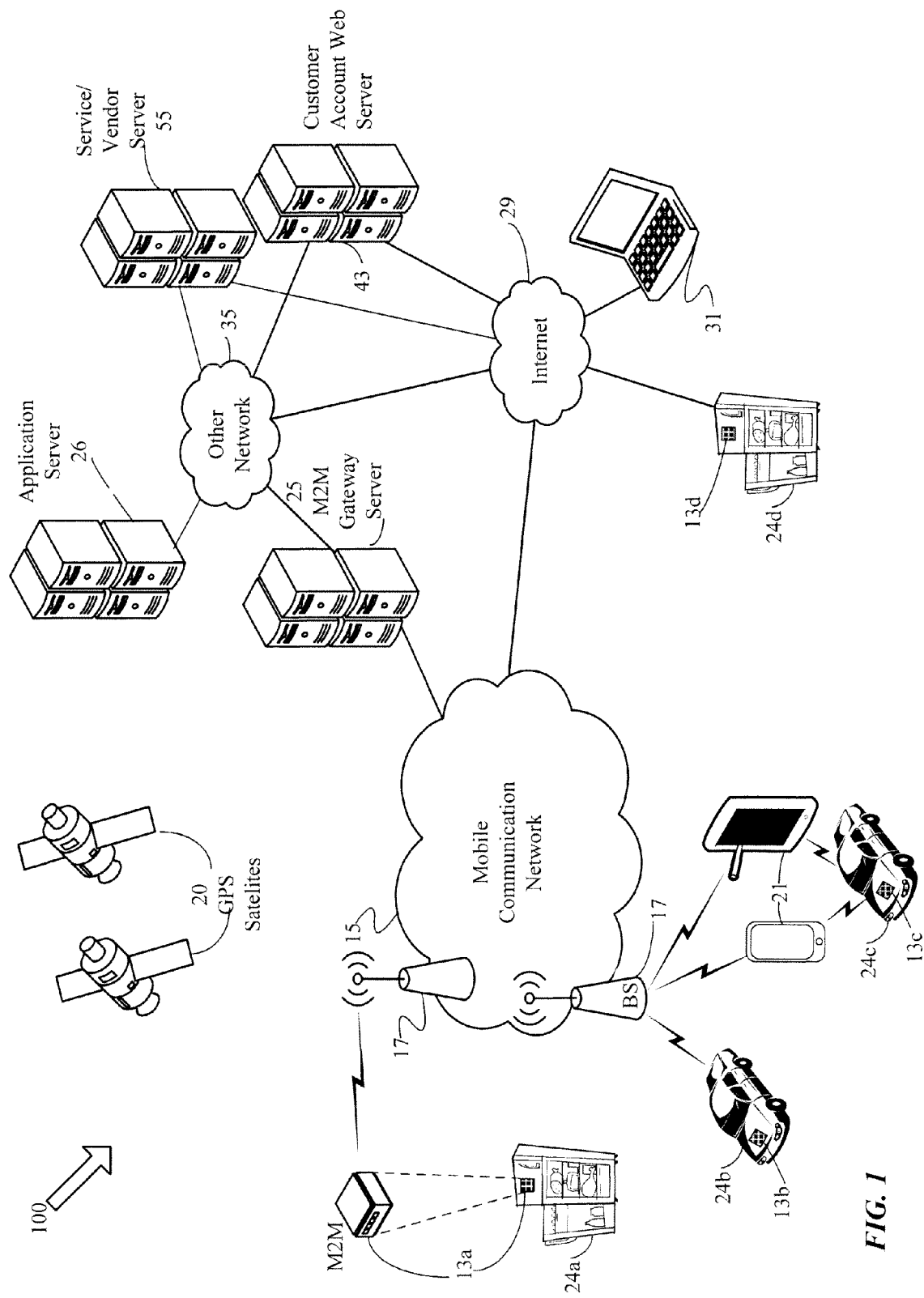
FIG. 1 illustrates a system providing a framework for M2M services.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples disclosed herein enable communication of the state of health information of a machine, as well as up to date options in connection with the health information. Sensors associated with the machine accumulate information regarding the health of the machine. A Machine-to-Machine (M2M) device receives the condition information from one or more sensors and provides a notification to a user/owner of the machine when the condition of the machine satisfies a service or alarm criterion (e.g., the user is notified of a defect or recommended maintenance schedule). The M2M device may be embedded in the machine or coupled via different interfaces to the machine. Further, the information is provided by the M2M device in the form of a data message to a remote server. The remote server includes a database of providers (e.g., preferred providers) that provide services and/or products for addressing the condition of the machine satisfying a service or alarm threshold (e.g., criterion). The remote server matches one or more participating providers based on various identified solutions for servicing the machine other considerations (e.g., geographic location). The remote server may update the relevant information from each participating provider, such as the latest cost, availability, time for the service (or when the product will arrive), etc. The user is then provided a list of providers to choose from with the relevant information displayed on a user interface of the machine and/or mobile device.

In the detailed examples discussed below, M2M communication with a server automates a variety of data gathering operations and/or provides automatic data communications in support of a variety of other automated applications increasingly demanded by consumers and service providers alike. In some examples, M2M devices use communication services offered by public mobile wireless communication networks. For example, M2M communications may take advantage of deployed wireless networks based on Third Generation Partnership Project (3GPP) technologies such as Global System for Mobile Communications (GSM), Universal Mobile Telecommunications System (UMTS), Long Term Evolution (LTE), and/or other technologies such as those developed by 3GPP2 and the Institute of Electrical and Electronic Engineers (IEEE). Accordingly, M2M communications may utilize an intrinsic data communication service of a public mobile/wireless communication network or a Wifi connection to reach the remote server. In one example, SMS or similar text messaging service is used.

Reference now is made in detail to the examples illustrated in the accompanying drawings and discussed below. FIG. 1 depicts a communication system 100 providing a framework for M2M services using wireless data communication capabilities of a mobile communication network. M2M services may include providing up-to-date information such as the options available to the user of the machine to remedy the condition of the machine meeting or exceeding a predetermined threshold (e.g., satisfying a service or alarm criterion). Communication system 100 includes a number of M2M devices 13a to 13d (collectively referred to "M2M devices 13"); one or more base stations 17; a mobile communication network 15; a gateway server 25; one or more application servers 26 accessed through a data network 35; a customer account web server 43; a personal computer 31; and GPS satellites 20. In practice, there may be more M2M devices 13, communication networks 15, application servers 26, personal computers 31, etc.

Communications for the M2M function extend between a number of M2M devices 13a to 13d and one or more application servers 26. An M2M device acts as a data processing and communication device that collects sensor information from a machine (e.g., refrigerator 24a, vehicle 24c, etc.,), and provides communications with other machines (e.g., application server) and/or the user. Put differently, M2M devices collect information harvested by the sensors of the respective machines they are coupled with and communicate the results to the owner/user of the machine by various methods described later. M2M devices 13 may be embedded in fixed location machines such as a refrigerator 24a, home-boilers (not shown), etc., or M2M devices 13 can be embedded in mobile machines such vehicles 24c.

Each application server 26 provides the M2M capability and function of an M2M remote receiver of health (e.g., sensor) information of the machine for subscribers. For example, the application server 26 includes a database of providers (e.g., preferred providers or vendors) that provide services and/or products for various problems or maintenance issues that the sensors identify. In one example, each provider subscribes with the application server 26 to offer their respective service(s) and/or product(s) to the owners of the machines and/or users associated with the M2M devices. For example, each provider is categorized by the application server 26 in terms of at least one of service, product, cost, location, time for project, reputation from prior dealings, etc. In one example, each provider maintains a vendor web-site and/or a server 55 that provides up-to-date information in connection with the type of products and/or services they provide, such as costs (including any time sensitive specials), time involved, availability, etc.

In the illustrated example, the application server 26 communicates with the vendor server 55 based on different trigger events. For example, the trigger events may be periodic (e.g., scheduled every morning), upon a notification from the vendor server that a change (e.g., price change) has occurred, or every time there is a query from a subscribing M2M device or machine (e.g., M2M device associated with the vehicle 24b or the refrigerator 24a). Accordingly, the application server 26 can match one or more providers based on the problem or maintenance issue identified by the sensors through the M2M communication and other considerations (e.g., geographic location) and communicate the options to the user, as will be discussed in more detail later.

As discussed above, the M2M devices 13a to 13d include (or communicate with) sensors that perform the function of each detecting the condition of various aspects of the machine. For example, sensors may detect whether a water filter of the refrigerator 24a should be replaced based on an active measurement (e.g., pressure reading) or a predetermined schedule (e.g., filter should be replaced every 6 months). In one example, refrigerator 24a may be a "smart fridge" in that the refrigerator 24a can track expiration dates of products the refrigerator 24a carries. For example when products are placed inside, the refrigerator 24a may identify the expiration dates via bar code or Quick Response (QR) code, near field communication (NFC), etc. Further, when placed at predetermined locations within the refrigerator, the refrigerator can identify whether the product is depleted by known sensor techniques (e.g., weight).

By way of another example, an M2M device couples to a port in a vehicle, such as an OBD-II port, to access sensor information. OBD-II provides access to data from the engine control unit (ECU) and may offer a valuable source of information to determine problems inside a vehicle. In one example, the SAE J1979 standard is used by the M2M device 13b to request various diagnostic data and a list of standard parameters that might be available from the ECU. The various parameters that are available are addressed by "parameter identification numbers" or PIDs, which are defined in J1979. Other sensors can be coupled to the M2M device 13b in addition to or instead of the OBD-II sensors.

For example, acoustic sensors may sense engine knock, misfiring in particular cylinders, or even glass breakage; engine coolant temperature (ECT) sensors may indicate excessive engine temperature; mass airflow (MAF) sensors may indicate if not enough air is entering the engine; oxygen sensors may monitor the amount of oxygen in the exhaust; etc. FIG. 2 illustrates a table of a non-exhaustive exemplary list of sensors that can be used with an M2M device to determine the health of the machine (e.g., vehicle 24b in this example).

Figure 3A:
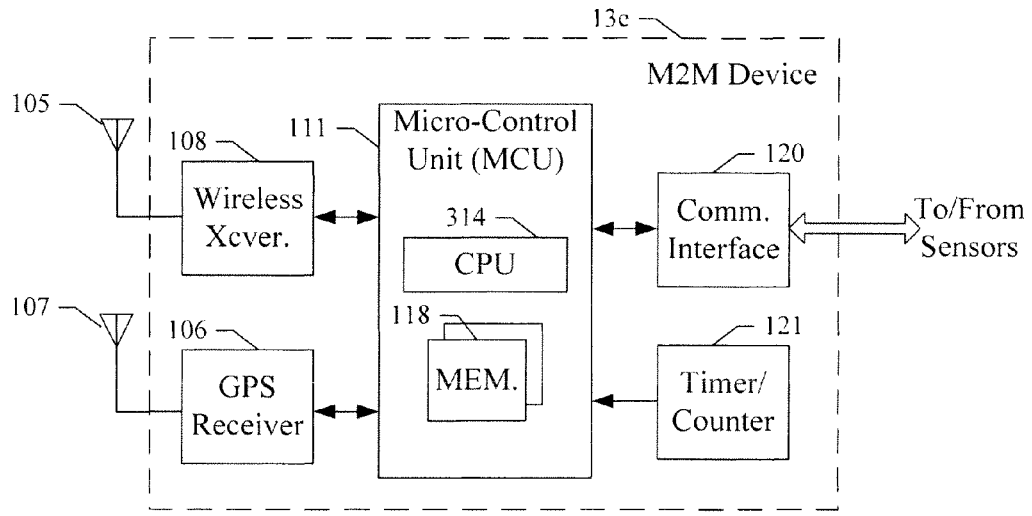
FIG. 3a illustrates a simplified block diagram of an M2M device.
Figure 3B:
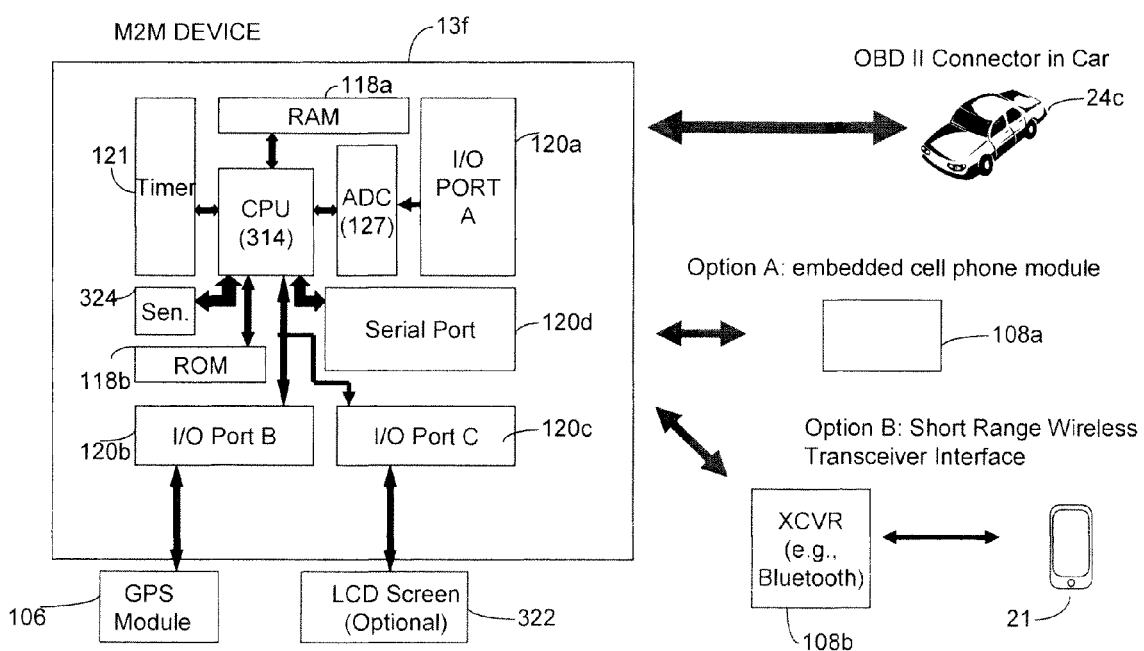
FIG. 3b illustrates a simplified block diagram of an M2M device used in a vehicle.

FIG. 3a illustrates a simplified block diagram of an M2M device 13e and FIG. 3b illustrates a simplified block diagram of an M2M device 13f used for a vehicle. In one example, the M2M device 13e includes a wireless transceiver 108, a microcontrol unit (MCU) 111, and a communication interface 120. In various examples, the transceiver 108 provides two-way wireless communication of information, such as digital message information, in accordance with the technology of the mobile communication network 15 or other technologies discussed below. In the example of FIG. 3a, the transceiver 108 sends and receives a variety of signaling messages in support of data services provided via the mobile the communication network 15. Each transceiver 108 connects through Radio Frequency (RF) send and receive amplifiers (not separately shown to) its antenna 105. In the example of FIG. 3a, the transceiver 108 is configured for RF communication in accord with a digital wireless protocol, such as the current 3GPP2 (e.g., CDMA) and 3GPP protocols (e.g., GSM and LTE) consistent with 3G, 4G, and beyond.

The example of FIG. 3b illustrates different ways for the M2M device 13f to communicate with the application server 26. For example, the M2M device 13f may have an embedded long range wireless transceiver 108a that is compatible with the mobile communication network 15. Alternatively or in addition, the M2M device 13f may have an embedded transceiver 108b that is a short range wireless transceiver configured to communicate with a mobile device (e.g., smart phone or tablet 21). Accordingly, the M2M device 13f can communicate with the application server 26 through the mobile device 21. The mobile device 21 may be coupled directly (e.g., placed on a docking station within the vehicle 24c) or communicate wirelessly through various short range wireless technology with the M2M device 13f. The various wireless technologies to communicate with the mobile device may include (but are not limited to): Digital Enhanced Cordless Telecommunications (DECT), Near Field Communication (NFC), ZigBee, and Bluetooth.

In the example of FIG. 3b, the M2M device 13f may have its own sensor(s) 324. In one example, M2M device 13f may have one or more ports (120a to 120d) for various data input and output purposes. For example, ports 120a to 120d may be configured to receive various sensor information discussed herein, communicate with a GPS module 106, provide information on a display screen, provide a serial interface to receive sensor information (e.g., OBD-II interface), respectively. In one example, sensor information that is in analog format may be further processed through an analog to digital converter (ADC) 127.

In one example (e.g., FIG. 3a), the M2M device 13e includes a GPS receiver 106 to provide location information to the application server 26. In other examples (e.g., FIG. 3b), the M2M device 13f uses the location information provided by the vehicle itself or the location information from the mobile device 21. In yet another example (e.g., for stationary appliances) the location information may not be provided to the application server 26. In this regard, the application server 26 may use the address provided under the subscription information to provide various services related to the location of the machine (discussed in detail in a later section).

The M2M device 13e further includes an MCU 111, which is an integrated circuit (IC) including a CPU 314 and memory 118. The memory 118 may comprise Random Access Memory (RAM) 118a and/or or Read Only Memory (ROM) 118b (as shown in FIG. 3b). The memory 118 performs various signal processing functions, including processing of digitized information from and to the transceiver 108. For example, the MCU 111 receives outbound data and provides digitally processed transmit data to the wireless transceiver 108 for transmitting them through an RF send amplifier (not shown) to its antenna 105. Similarly, for reception of data, the MCU 111 receives data from its transceiver 108 via RF receive amplifier (not shown) and its antenna 105, for processing. The MCU 111 also receives GPS information from a GPS receiver 106 (via antenna 107). Thus, the M2M device 13 may include a global positioning receiver (GPS) that receives and processes signals from GPS satellites (e.g., 20 in FIG. 1) to determine its geographic location. In other examples, the location information is provided by the machine itself through the communication interface 120 or from a mobile device through the wireless transceiver 108 or a docking station. For example, the machine (e.g., vehicle 24b) may have its own GPS receiver that is used to provide the location information to the application server 26. Alternatively, (e.g., where the machine 24b and the M2M device 13b do not have their own GPS receiver) the GPS receiver of the mobile device 21 can be used to provide the location information of the machine to the application server 26.

In one example, the M2M device 13 itself includes various sensors (e.g., acoustic, vibration, temperature, etc.,) to provide information to the MCU 111 instead of, or in addition to, the external sensors. In one example, a timer/counting element 121 is used to provide an alert for a predetermined schedule (e.g., filter should be replaced every six months or 10,000 miles). Thus, a timer or counter element can also be used as a sensor.

Accordingly, the MCU 111 serves as a programmable controller or processor for the M2M device 13e, in that the MCU 111 controls all operations of the M2M device 13e in accord with programming that the MCU 111 executes, for all normal operations, and for operations involved in determining utility usage information and determining GPS location consideration here. In the example of FIG. 3a, the M2M device 13e includes memory 118 (e.g., flash), for storage of various "software" or "firmware" program routines and mobile configuration settings, such as mobile telephone number (MTN or MDN), history of SMS sent and received, etc. The memory 118 may also include a non-volatile read only memory (ROM) or volatile random access memory (RAM) for a working data processing memory. In a present implementation, the memory 118 stores firmware such as a boot routine, device driver software, an operating system, call processing software, and any of a wide variety of other applications, such as short message service software. Programming stored in the memory 118, sometimes referred to as "firmware," is loaded into and executed by the CPU 314.

As outlined above, the M2M device 13e includes an MCU 111, and programming stored in the memory 118 configures the MCU 111 so that the M2M device 13e is capable of performing various functions, including in this case the functions involved in the technique for determining the condition of operation of a machine of a user, automatically recognizing a potential for servicing of the machine in response to the sensing of the condition, and communicating the potential for servicing to the user/owner and/or the application server 26. The sensor information is provided by one or more sensors (not shown) through one or more communication interfaces 120. In one example, the communication interface 120 is compatible with an OBD-II interface.

Referring back to FIG. 1, the M2M devices 13a to 13d and the M2M application server 26 communicate data via an Internet Protocol (IP) data network 35, and a public data network (PDN) shown as a mobile traffic network 15. The gateway server 25 is an entity within the wireless network 15 that acts as an intermediary between the wireless communication network 15 and the application server 26. The application server 26 performs the function of matching the appropriate provider with the user and electronically soliciting bids to provide different options to address the potential for servicing, as discussed in more detail below. The different options include different providers and different approaches (e.g., solutions) identified by the application server 26. The user can then come to an intelligent choice on which option to pursue based on different considerations, such as cost, location, availability, time, etc.

The mobile communication network 15 may include any type of network, such as a wide area network (WAN), a local area network (LAN), a public switched telephone network (PSTN), a cellular network, the Internet, a private network, or a combination of networks. Network 15 may provide services and/or resources to facilitate communication between M2M devices 13/base stations 17 and M2M application server 26. In one example, the mobile communication network 15 allows text messaging between M2M devices 13a to 13d and similar messaging with other devices via the Internet. For example, SMS can be sent over Code Division Multiple Access (CDMA), GSM, or LTE. The network 15 typically offers a variety of other data services to mobile devices (e.g., 21) via the Internet 29, such as downloads, web browsing, e-mail, etc.

The mobile communication network 15 typically is implemented by a number of interconnected networks. Hence, the overall system 100 may include a number of radio access networks (RANs), as well as regional ground networks interconnecting a number of Radio Access Networks (RANs) and a wide area network (WAN) interconnecting the regional ground networks to core network elements, such as the application server 26. A regional portion of the network 15, such as that serving M2M devices 13a to 13d, typically includes one or more RANs and a regional circuit and/or packet switched network and associated signaling network facilities.

Physical elements of a RAN, operated by one of the mobile service providers or carriers, include a number of base stations, represented in the example by the base stations (BSs) 17. Such base stations 17 typically comprise a base transceiver system (BTS) which communicates via an antennae system at the site of base station 17 and over the air-link with mobile devices 21 and one or more of the M2M devices 13a to 13d within range. Each base station 17 typically includes a BTS coupled to several antennae mounted on a radio tower within a coverage area often referred to as a "cell." The BTS is the part of the radio network that sends and receives RF signals to/from the mobile devices that the base station currently serves. For such radio communications, each M2M device 13a to 13d has (or has access to) a compatible wireless transceiver.

The radio access networks also include a mobile communication network represented generally by the cloud at 15, which carries the user communications for the M2M devices 13a to 13d between the respective base stations 17 and other elements with or through which the M2M devices 13a to 13d communicate. Individual elements such as switches and/or routers forming the traffic network 15 are omitted here for simplicity.

The traffic network portion of the mobile communication network 15 connects to a public packet switched data communication network, such as the network commonly referred to as the "Internet" shown at 29. Packet switched communications via the traffic network 15 and the Internet 29 may support a variety of user services through the network 15, such as mobile device communications of text and multimedia messages, e-mail, web surfing or browsing, programming and media downloading (including audio and video), etc. For example, the application server 26 may be able to receive messages from and send messages to user terminal devices, such as personal computers, either directly (peer-to-peer) or via various servers (not separately shown). The drawing shows one such user terminal device as a personal computer (PC) or server 31, by way of example. For purposes of discussing notification messages, some notifications may entail an e-mail or SMS message transmission of a notification that the machine may need service and what the options for providing this service are. This message can be viewed by an account holder on his or her terminal, such as PC 31 via the Internet 29.

As discussed above, to enable the communication of data for the M2M devices 13a to 13d, each such device includes (or is coupled wirelessly or physically with a mobile device that includes) a wireless transceiver. Accordingly, an M2M can provide network access capability, in this example, to the wireless digital network 15. Physically, an M2M device 13a to 13d may include features similar to selected components of a mobile telephone station, such as mobile device 21, including the appropriate transceiver components for communication through the network but without the elements for voice input/output and vocoder and transceiver elements for communications of voice information. Alternatively, the M2M device may be coupled wirelessly or physically with a mobile device (e.g., via short range communication transceiver or docking station) to provide communication over mobile communication network 15.

In one example, each M2M device 13a to 13d processes the data obtained from one or more sensors and provides a notification on a user display of the machine. For example, a display on the vehicle indicates that the front right headlight should be replaced (e.g., using a photodiode that senses the light output or a current sensor that sense no current is flowing through the circuit that should supply the current used to light the headlight). Alternatively or in addition, the M2M device notifies the application server 26 of the sensed condition of the vehicle satisfying (e.g., meeting or exceeding) a service or alarm criterion. In one example, the M2M device 13b sends the condition of the vehicle meeting or exceeding a service or alarm criterion information as a text message to the application server 26. In one example, the M2M device 13b includes its identifier, such as MSID (e.g., MDN), in the transmission. Further, the M2M device 13b includes the GPS coordinates of the machine. In various embodiments, the location information is provided either by a GPS receiver of the M2M device 13b itself, the machine (e.g., vehicle 24b), or even the mobile device 21 (to which the M2M device (e.g., 24c in this case) is coupled with (e.g., either wirelessly or via docking station)).

Each text message to the application server 26 may also include the date and time of the transmission, the model number of the machine, and other relevant information related to the sensed condition of the machine satisfying a service or alarm criterion. The relevant information may be limited, such as a diagnostic code for the machine, which the application server 26 then translates using previously stored information. Alternatively, the relevant information may include a more complete description of the problem indicated by the sensor for the application server 26 to parse. In one example, upon receiving the data text message, the application server 26 sends an acknowledgement text message back to the respective M2M device (e.g., 13a) that sent the data text message to the application server. The acknowledgment confirms that the application server received the data text message and that the information therein has been successfully processed. If no acknowledgment text message is received by the respective M2M device (e.g., 13a) it may indicate one of several things. For example, it may indicate that the received text (or other) message from the M2M device (e.g., 13a) was corrupted and thus not processed. Lack of an acknowledgment may also indicate that the text message from the M2M device (e.g., 13a) was simply not received by the application server 26, and thus one or more problems exist including an issue with the M2M device transmitter, the application server 26 and/or the network. When an acknowledgment message is not received by the M2M device (e.g., 13a) within a predetermined time, the respective M2M device waits for a second predetermined time (e.g., 10 minutes) and sends another text message with substantially similar information to the original text message (e.g., problem, date, time of the transmission, location, etc.). In one example, the second predetermined time can vary based on different parameters, including type of machine, type and/or severity of the problem, user priority (e.g., paid for special service), etc.

In one example, an M2M device (e.g., 13a) has GPS coordinates and/or the address of its location pre-programmed (i.e., stored) within its memory. For example, instead of actively determining the location information via a GPS receiver, the M2M device 13a provides the application server 26 the location information stored in its memory via the mobile communication network 15. Such approach is more appropriate for stationary devices (devices that are intended to remain stationary), such as a smart refrigerator or boiler.

In one example, the M2M device (e.g., 13d) does not use the mobile communication network 15 to communicate with the application server 26 to provide the health information of the respective machine (a smart refrigerator 24d in this example). Instead, the M2M device may communicate with the application server 26 through the Internet 29 via Wifi or Ethernet connection.

To control service authorization and providing up-to-date information regarding the options available in connection with the machine monitoring features, the carrier operating the wireless network 15 also operates a home location register (HLR) (not shown) that stores subscriber profiles and related call processing control information for each of that carrier's wireless subscribers and their wireless accounts. Of note for purposes of this discussion, the HLR also stores relevant profiles or service control records, for the M2M devices (e.g., 13a and 13b). The HLR may reside in the home message service center (MSC), however, in the example, the HLR resides in a centralized node sometimes referred to as a service control point (SCP). For purposes of the SMS communications, an HLR stores for each M2M device or mobile device registered therewith, the subscriber's MSID (e.g., MDN or MIN), as well as other features. One aspect of normal HLR processing of an incoming SMS call involves translation of the MDN associated with the call into the MIN, for use in completing the call to the mobile device 21. For each M2M device with a long range wireless transceiver compatible with the mobile communication network 15 (e.g., 13a and 13b), the HLR also stores data identifying the current point of attachment of an M2M device (e.g., 13a and 13b) to the network. The HLR also acts as a message service center (MSC) that routes the text messages to and from the base station 17. In a network of the type shown in FIG. 1, the information identifies the MSC at which the mobile device 21 most recently registered. For example, the network uses the MSC address information to route the SMS message through to the respective M2M device 13a to 13d at its location.

Accordingly, the MDN is the telephone number of M2M devices 13a and 13b served through the mobile communication network 15. In one example, when a mobile device 21 is used by the M2M device (e.g., 24c), the MDN number of the mobile device 21 is used. In one example, the application server 26 can use the machine identification number (MID) of the machine (e.g., 24c) for identification. For example, text messages intended for a mobile device 21 use the M2M device's MDN as a destination address. For outgoing messages (e.g., SMS text messages) from an M2M device, the identifier of the M2M device (e.g., MDN) is used during procedures to authenticate the M2M device and/or to determine if the subscriber is authorized to use the particular service through the network 15. For example, the authentication is provided by an authentication server (not shown). In this regard, the M2M device registers with the network 15, and the network 15 authenticates the M2M device, e.g. to check that the M2M device has a valid MSID (e.g., MDN, MIN, or the like). As discussed above, some M2M devices, such as an M2M device 13a of a smart refrigerator 24a, are assigned to a specific home/location. In one example, before the application server 26 accepts the remote sensor reading of an M2M device (13a to 13d), it correlates the MID with subscription information stored in its database.

It should be noted that the remote reading of the machine condition information may be either through a push or pull operation. For example, the M2M device (e.g., 13a to 13d) may itself initiate the transmission of the information to the application server 26 at predetermined intervals or when a criterion is met (e.g., a condition of the machine satisfies a service or alarm threshold). In another example, the application server 26 automatically requests the data to be transmitted by the M2M device at a predetermined period or when a predetermined criterion is met. In one embodiment, a predetermined criterion may be met when an owner of the account associated with the machine (e.g., 24a to 24d) requests a status update from the application server 26 (or a web server 43 discussed below).

Application server 26 may be a third party server performing solicitation of information related to the condition of a machine satisfying a service or alarm criterion. In one example, one or more additional servers, such as an account web server 43, are used to provide additional services to an account holder. Although a single server 43 for customer account web server 43 and a single server for application server 26 are shown in FIG. 1, a large entity providing up-to-date information in connection with a machine condition and the available options may have a number of such servers. Account web server 26 and/or customer account web server 43 may store account information associated with each M2M device, including prior defect history for a machine associated with the M2M device. Further, an account holder may specify on the account web server 43 his or her preferred providers for various products and/or services, as well as notifications he or she would like to receive. The notification requests may be periodic or when a predetermined criterion is met, such as a message sent to the application server 26 after sensors of a M2M device detect a condition of the machine satisfying a service or alarm criterion. For example, the account holder may specify on the account web server 43 that a notification message should be sent to a user interface (e.g., display screen) of the machine 24a, to a mobile device 21, or even an e-mail associated with an M2M device (e.g., 13a) when one or more predetermined criterion is met. For example, such notification may be read on a terminal 31 through the internet 29. Thus, a notification may be provided by the account web server 43 to an e-mail account of a subscriber associated with an M2M device (e.g., 13a) when a predetermined criterion (e.g., filter is clogged) is met. While FIG. 1 illustrates the application server 26 to be separate from the customer account web server 43, in one embodiment, the customer account web server 43 is part of the application server 26.

Figure 4A:
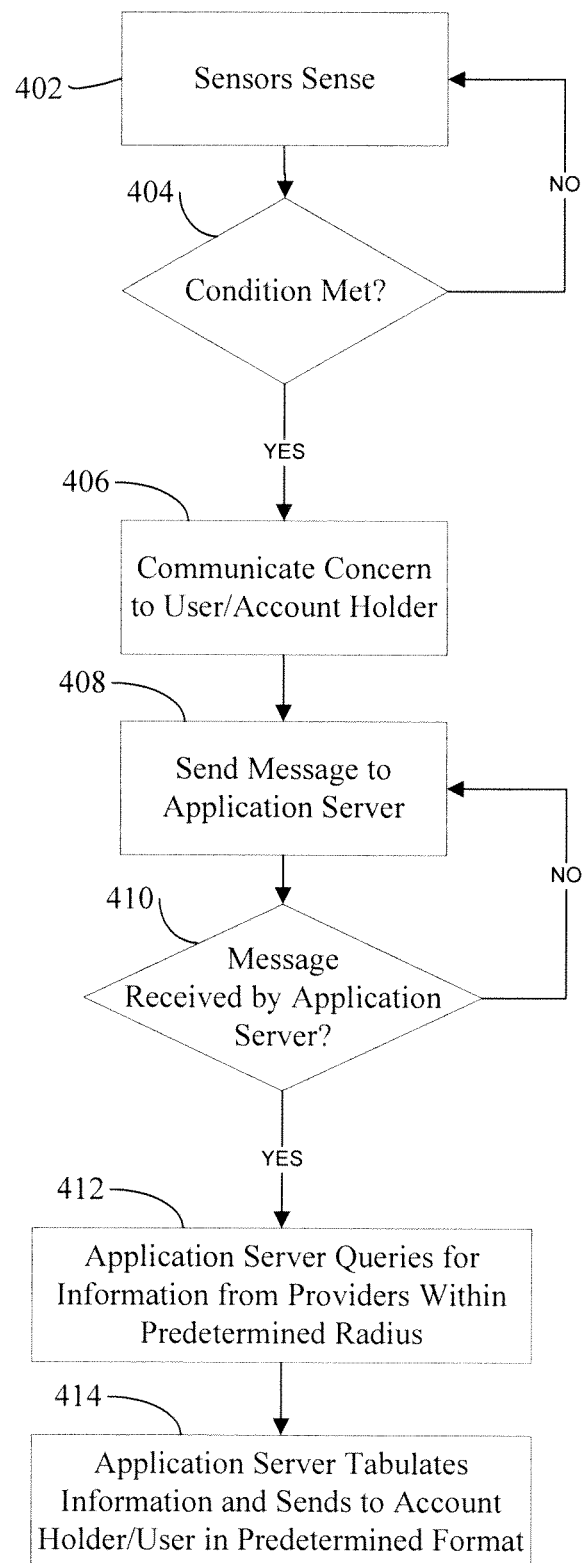
FIG. 4a is an exemplary flow chart illustrating communication between an M2M device and an application server, where the M2M device includes communication capability over a mobile communication network.

With the foregoing overview of the system, it may be helpful now to consider a high-level discussion of an example of a machine diagnostic. FIG. 4a illustrates an exemplary communication between an M2M device 13 and an application server 26, where the M2M device 13 has communication capability over a mobile communication network 15. While the method of FIG. 4a can accommodate various machines (e.g., home appliances, vehicles, etc.), by way of example the following discussion uses a vehicle.

In step 402, one or more sensors monitor the condition of various aspects of a machine (e.g., vehicle 24b). The sensors may monitor the condition of the machine at predetermined intervals, continuously, or after a criterion is met. For example, the temperature of the engine may be monitored continuously when the engine is ON; tire pressure checks may be performed every 10 minutes; and acoustic checks of the engine may be performed after 15 min of continuous engine operation (e.g., the predetermined criterion). In various examples, the sensors may be part of an OBD-II system that are read by an M2M device (e.g., 13b) or sensors coupled to (or part of) an M2M device.

In step 404, the M2M device coupled to the machine determines whether the condition, sensed by one or more sensors, meet or exceed a service or alarm threshold (e.g., a service or alarm criterion). For example, a predetermined criterion may be one or more sensors indicating that a flow through a filter is above a threshold level or that a filter has filtered a threshold amount of substance (e.g., water, air, oil, etc.) and therefore should be replaced. In one example, the criterion is based on a predetermined schedule (e.g., every six months or every year). Thus, as mentioned before, a timing/counter element is included in the definition of a sensor herein. If a predetermined criterion is not met, the system continues monitoring the machine.

In step 406, upon determining that a predetermined condition is met, the M2M device communicates the status of the machine (e.g., recommended service or malfunction) to the user (or account holder) of the machine (e.g., vehicle 24b). For example, a display on the user interface of the machine 24b indicates the status (e.g., the air filter should be replaced).

In one example, (not shown in the flowchart of FIG. 4a) the user is provided on its user interface an option to receive additional information regarding the status (e.g., machine satisfying a service or alarm criterion). In one example, the method proceeds with step 408 only upon receiving a confirmation from the user of the machine 24b to obtain additional information.

In step 408, a data message is sent to an application server 26 by the M2M device 13b. The message includes relevant information, such as the respective error code(s) identified by the sensor(s), the MID of the machine 24b and/or the identifier of the M2M device, and the location information. In various examples, the location information is provided by the GPS receiver of the machine 24b or the GPS receiver of the M2M device. In one example, the data message is sent by the M2M device 13b via a wireless transceiver through a mobile communication network 15 to the application server 26. For example, the data message is sent from the M2M device 13b through the mobile communication network 15 as an SMS message.

In one example, the M2M device 13b determines whether the data message is received by the application server 26 (i.e., step 410). For example, the M2M device monitors for a confirmation from the application server 26. If a confirmation is not received (e.g., the vehicle is driving through a tunnel), the M2M device 13b of the machine (vehicle 24b) continues sending the data message to the application server at predetermined intervals (e.g., every 5 minutes) until a confirmation is received.

In step 412, upon receiving the data message from the M2M device 13b, the application server 26 searches its (or an associated) database for providers that can address the condition identified by the sensors. In one embodiment, the providers being searched are limited based on criteria such as user ratings of the providers, and/or providers that have engaged in a commercial venture with the application server provider. The application server 26 may narrow the selection of providers based on a predetermined distance (e.g., radius) from the location information in the data message. In one example, the radius varies dependent on the location of the machine, e.g., the radius may be larger in rural areas than in more densely populated areas. In another example, the radius varies dependent on the type of provider or problem, e.g., the radius may be larger for helicopter repair than for garages needed to repair a vehicle. For example, the application server has a database that includes information from each subscribed provider. The information may include the services/products provided, cost, location, time to fix, feedback ratings from prior clients, length of time in the business, etc. The information is updated by the application server 26 by electronically contacting (e.g., via private network 35 or Internet 29) the service/vendor server 55 of each provider at predetermined intervals (e.g., every morning). In one example, the application server 26 solicits up-to-date information from the service/vendor website or server 55 of every provider identified within the predetermined radius of the GPS location information provided by the M2M device upon receiving the data message from an M2M device, if the information is older than a predetermined time (e.g., 1 hour). For example, when business is slow or when a client has cancelled an appointment, a provider may offer time limited discounts that the application server can identify with the query. The provider may also push this information to the application server in the event that its pricing changes.

In step 414, the application server tabulates all information from the different providers and sorts it in a predetermined order or based on account holder preferences. As discussed before, the account holder preferences may be stored in the customer account web server 43 and/or application server 26. For example, the application server 26 may provide a "tailored response data message" to the M2M device 13b of the machine. For example, the tailored response information may include the different solutions (e.g., approaches) to remedy the machine satisfying a service or alarm criterion, recommended approach, cost for each approach charged by each provider, location/distance of the provider, time it takes to service the machine by each provider, rating of each provider, length of time in business for each provider (e.g., in different orders). The tailored message is displayed on a user interface of the machine (e.g., vehicle 24b in this example). For example, the displayed order may be based on the lowest cost or proximity to the machine 24b. In one example, the application server calculates an average cost and an average time to service the machine, based on the information harvested from the providers. Further, the application server 26 may identify whether the machine status provided in the data message requires immediate attention or can wait until a next service call. Thus, the recipient (e.g., user or account holder) of this "tailored information" will be able to make intelligent decisions and avoid overpaying—regardless where he or she decide to service the machine.

In one example, the application server 26 maintains in its database a list of recalls for each machine (e.g., 24b) or solicits recall information from a web-site or vendor server 55. For example, the application server may correlate the error codes received in the data message from an M2M device with the latest recalls. If it is a service that is under a recall, the selection is limited to authorized providers that deal with this recall. Accordingly, if there are several matched providers, the tailored response data message for the machine 24b (i.e., in response to the data message received by the application server 26) is narrowed to one or more providers that are authorized by the manufacturer to deal with the recall.

The tailored response data message is sent to the user and/or account holder of the machine 24b. For example, the application server 26 sends the tailored response data message to the M2M device 13b that originated the data message as an SMS message through the mobile communication network 15. The M2M device can then display the tailored response data message on the user interface of the machine 24b, thereby providing the user various options to choose from. In one example, upon making a selection, the M2M device contacts the application server 26 again with the selection to schedule an appointment or order a product with the selected provider.

Figure 4B:
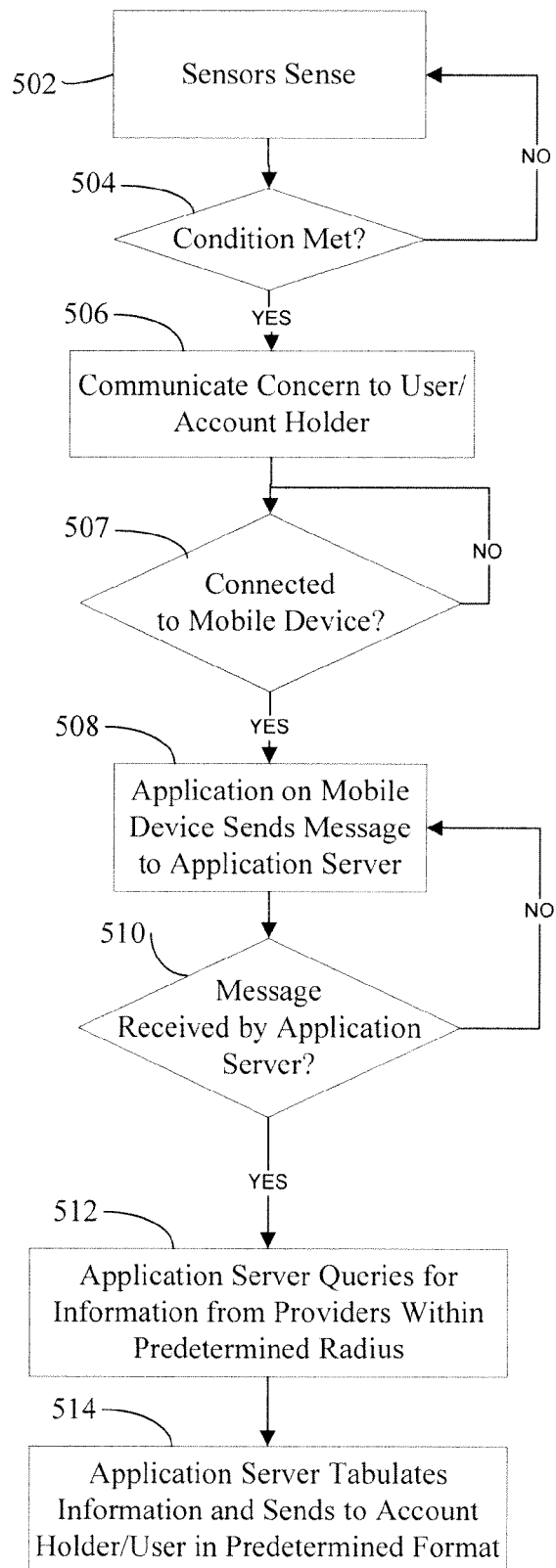
FIG. 4b is an exemplary flow chart illustrating communication between an M2M device and an application server, where the M2M device uses a mobile device to communicate over a mobile communication network.

As discussed before, an M2M device 13 need not have its own wireless transceiver that is compatible with mobile communication network 15. Instead, the M2M device 13 can communicate with the application server 26 through the Internet 29 or via a mobile communication device 21. For example, FIG. 4b illustrates an exemplary communication between an M2M device 13c and an application server 26, where the M2M device 13c uses the transceiver of a mobile device 21 to communicate with the application server 26. Again, for simplicity, the following discussion assumes that a vehicle 24c is monitored.

In step 502, one or more sensors monitor the condition of various aspects of a machine (e.g., vehicle 24c). The sensors may monitor the condition of the machine 24c at predetermined intervals, continuously, or after a criterion is met. In various examples, the sensors may be part of an OBD-II system that are read by an M2M device (e.g., 13c) or sensors coupled (or be part of) an M2M device.

In step 504, the M2M device 13c coupled to the machine determines whether a predetermined condition is met (e.g., a condition of the machine satisfies a service or alarm criterion). For example, a predetermined criterion may be one or more sensors indicating that a flow through a filter is above a threshold or that a filter has filtered a threshold amount of substance (e.g., water, air, oil, etc.) and therefore should be replaced. In one example, the criterion is based on a predetermined schedule (e.g., every six months or every year). If a predetermined criterion is not met, the system continues monitoring the condition of the machine 24c. When a predetermined condition satisfies a service or alarm criterion, the respective one or more error codes are stored in a memory of the M2M device.

In step 506, upon determining that a condition, sensed by one or more sensors, satisfies a service or alarm criterion, the M2M device 24c communicates the status (e.g., recommended service or malfunction) to the user (or account holder) of the machine (e.g., vehicle 24c). For example, a display on the user interface of the machine 24c displays the condition (e.g., the air filter should be replaced). In one example, (not shown in the flowchart of FIG. 4b) the user is queried whether he or she would like to receive additional information in connection with the identified condition. In one example, the method proceeds with step 507 only upon receiving a confirmation from the user of the machine 24c to obtain additional information.

As mentioned above, in the example of FIG. 4b it is assumed that the M2M device 13c does not use/have its own wireless transceiver that is compatible with mobile communication network 15. The M2M device 13c therefore needs to couple with a mobile device 21 to be able to communicate with the application server 26 via the mobile communication network 15. The mobile device 13c may be coupled directly (e.g., placed on a docking station within the vehicle 24c) or communicate wirelessly through various short range wireless technologies with the M2M device 13c, such as DECT, NFC, ZigBee, or Bluetooth.

In one example, the mobile device 21 has programming stored in its memory (e.g., an application) that configures the mobile device 21 to perform various functions, including communicating with the M2M device 13c, extracting a data message based on sensor information from the M2M device 13c, communicating the data message to the application server 26 through the mobile communication network 15, and receiving confirmation messages from the application server 26. Put differently, an application can be loaded to a mobile device 21 to provide the functions described herein.

In step 507, the M2M device 13c determines whether it is connected (e.g., via a short range wireless connection or docking station) with a mobile device 21. For example, the M2M device 13c may determine whether there is successful Bluetooth pairing with a pre-configured mobile device 21. If not, the M2M device 13c waits until a connection with a mobile device 21 is established. In one example, when the M2M device successfully pairs with the mobile device and transfers the data message, it assumes that the mobile device will ultimately succeed in routing the data message to the application server 26 and does not request a confirmation from the application server 26.

In step 508, upon determining that a valid connection exists between the M2M device and the mobile device 21, the mobile device 21 receives the data message from the M2M device and sends the same to an application server 26 via the mobile communication network 15. The message includes relevant machine status information, such as the respective error code(s) identified by the sensor(s), the MID of the machine 24c and/or the M2M device, and the location information. In various examples, the location information is provided by the GPS receiver of the machine 24c, the GPS receiver of the M2M device 13c, or the GPS receiver of the mobile device 21. In one example, the data message is sent from the M2M device 13c via the mobile device 21 through the mobile communication network 15 as an SMS message.

In one example, the mobile device 21 determines whether the data message has been received by the application server 26 (i.e., step 510). For example, the mobile device 21 monitors for a confirmation from the application server 26. If a confirmation is not received (e.g., the vehicle is driving through a tunnel and therefore is beyond the range of a base station 17), the mobile device 21 continues sending the data message to the application server 26 at predetermined intervals (e.g., every 5 minutes) until a confirmation is received.

In step 512, upon receiving the data message from the M2M device 13c via the mobile device 21, the application server 26 queries its (or an associated) database for providers that can service the problem(s) or maintenance issues(s) identified by the sensors. In one embodiment, the providers being searched are limited based on criteria such as user ratings of the providers, and/or providers that have engaged in a commercial venture with the application server provider. The application server 26 also queries its database for various solutions for the problem(s) or maintenance issue(s). The application server 26 may narrow the selection of providers for each solution based on a predetermined distance (e.g., radius) from the location information received in the data message. In one example, the radius varies dependent on the location of the machine, e.g., the radius may be larger in rural areas than in more densely populated areas. In another example, the radius varies dependent on the type of provider or problem, e.g., the radius may be larger for helicopter repair than for garages needed to repair a vehicle. For example, the application server 26 has a database that includes information from each subscribed provider. The information may include the services/products provided, cost, location, time to fix, feedback ratings from prior clients, length of time in the business, etc. The information is updated by the application server 26 by electronically contacting (e.g., via private network 35 or Internet 29) the service/vendor web-site or server 55 of each provider at predetermined intervals (e.g., every morning). In one example, the application server 26 solicits up-to-date information from the service/vendor server 55 of every provider identified within the radius of the GPS location information provided by the mobile device 21 upon receiving the data message from an mobile device 21, if it is older than a predetermined period (e.g., 1 hour).

In step 514, the application server tabulates all information from the different providers and sorts the information in a predetermined order or based on account holder preferences. As discussed before, the account holder preferences are stored in the customer account web server 43 and/or application server 26. For example, the application server 26 may provide relevant information, such as the cost, location of the provider, time it takes to service the machine for each solution, rating, and/or length of time in business for each provider, in an order least cost or closest to the machine 24c. The application server may also calculate an average cost and an average time to service the machine as well as an indication whether the machine status (e.g., condition of the machine satisfying a service or alarm criterion) warrants immediate attention or can wait until the next regular service call. Thus, the recipient of this "tailored information" will be able to make intelligent decisions and not overpay—regardless where they decide to service the machine.

In one example, the application server 26 maintains in its database a list of recalls for each machine (e.g., 24c). As mentioned before, the application server 26 may correlate the error codes with the latest recalls. If it is a service that is under a recall, the selection is limited to authorized providers that deal with the recall.

The tailored response data message is sent to the user and/or account holder. For example, the application server 26 sends the tailored response data message to the mobile device 21 that originated the data message as an SMS message through the mobile communication network 15. The M2M device can then display the tailored response data message on the user interface (e.g., interactive screen) of the mobile device 21, thereby providing the user various options to choose from. In one example, upon making a selection, the mobile device 21 contacts the application server 26 again (e.g., via SMS) with the selection to reserve an appointment with the selected provider. In one example, the mobile device 21 displays an option to dial a customer service representative of the provider. Upon selection, the user can further discuss the condition of the machine satisfying a service or alarm criterion with the customer service representative, schedule an appointment, etc., while having the relevant information, such as cost, location, etc., displayed on the user interface of the mobile device. In one example, the mobile device sends the tailored response data message to the machine 24c to have the information displayed on a user interface of the machine 24c.

Figure 5:
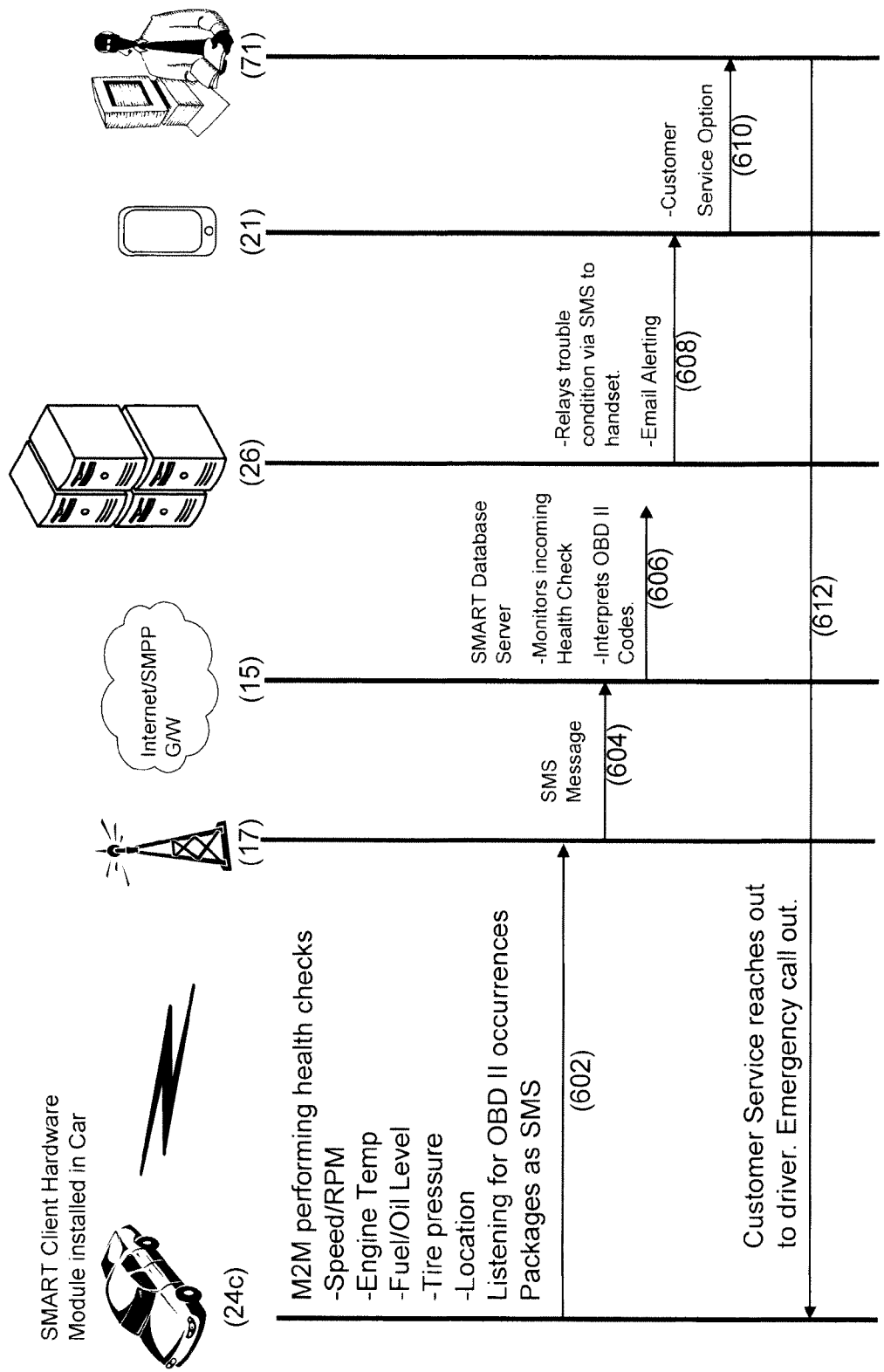
FIG. 5 illustrates an exemplary call flow having a customer service option.

FIG. 5 illustrates an exemplary call flow having a customer service option. Again, for simplicity, the following discussion assumes that a vehicle 24c is monitored.

In step 602, one or more sensors monitor the condition of various aspects of a machine (e.g., vehicle 24c). The sensors may monitor the condition of the machine 24c at predetermined intervals, continuously, or after a criterion is met. In the example of FIG. 5, the vehicle 24c includes an M2M device 13c that receives the health information from the sensors. An alert is generated in the form of a data message by the M2M device in the vehicle 24c when a condition of the machine satisfies a service or alarm criterion. For example, the criterion may be that a filter has filtered a threshold amount of substance (e.g., water, air, oil, etc.) and therefore should be replaced. The data message is sent to a base station 17 of a mobile communication network 15.

In step 604, the base station 17 sends the data message via a mobile communication network 15, destined for an application server 26. In one example, the data message is sent as an SMS text message.

In step 606, the mobile communication network 15 routes the data message to the application server 26. The application server 26 queries its (or an associated) database for providers that can service the problem(s) or maintenance issues(s) identified by the sensors. The application server 26 also queries its (or an associated) database for various solutions for the problem(s) or maintenance issue(s). In one embodiment, the providers being searched are limited based on criteria such as user ratings of the providers, and/or providers that have engaged in a commercial venture with the application server provider. The application server 26 may narrow the selection of providers for each solution based on a predetermined distance (e.g., radius) from the location information received in the data message. In one example, the information is updated by the application server 26 by electronically contacting (e.g., via private network 35 or Internet 29) the service/vendor web-site or server 55 of each provider at predetermined intervals (e.g., every morning). In one example, the application server 26 solicits up-to-date information from a service/vendor server 55 of every provider identified within the radius of the GPS location information provided by the mobile device 21 upon receiving the data message from an mobile device 21, if it is older than a predetermined period (e.g., 1 hour).

In step 608, the application server 26 tabulates all information from the different providers and sorts the information in a predetermined order or based on account holder preferences and sends it to the user. As discussed before, the account holder preferences are stored in the customer account web server 43 and/or application server 26. For example, the application server 26 may provide relevant information, such as the cost, location of the provider, time it takes to service the machine for each solution, rating, and/or length of time in business for each provider, in an order least cost or closest to the vehicle 24c. The application server may also calculate an average cost and an average time to service the machine as well as an indication whether the machine status (e.g., condition of the machine satisfying a service or alarm criterion) warrants immediate attention or can wait until the next regular service call. The tailored information is sent to the user (e.g., machine 24c or M2M device in the machine 24c). In one example of FIG. 5, the tailored response from the application server is sent to a registered mobile device 21 of the user. For example, the application server 26 sends the tailored response data message to the mobile device 21 that originated the data message as an SMS message through the mobile communication network 15. The M2M device can then display the tailored response data message on the user interface (e.g., interactive screen) of the mobile device 21, thereby providing the user various options to choose from.

In step 610, upon making a selection, the mobile device 21 contacts a customer service representative 71 of the provider selected. For example, the user of the machine 24c can reserve an appointment with the selected provider through the customer service representative 71.

In step 612, upon receiving the inquiry from the mobile device 21 of the user, the customer service representative communicates with the user and can setup an appointment or dispatch the appropriate service/product to the machine (e.g., vehicle 24c).

Figure 6:
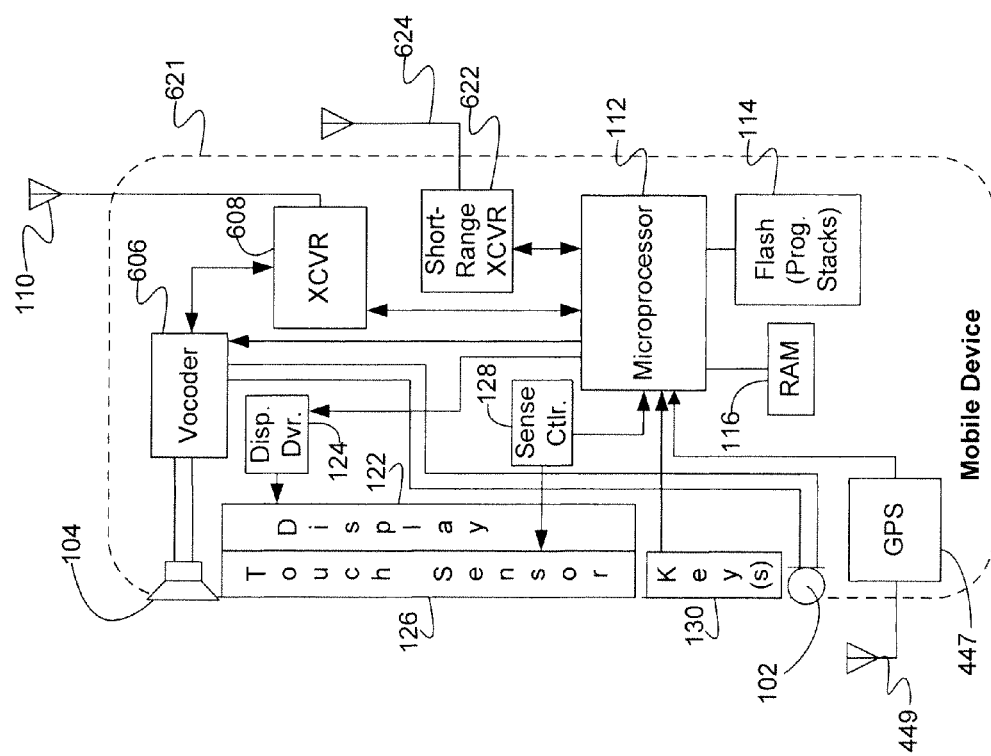
FIG. 6 illustrates a high level simplified functional block diagram of an exemplary mobile device.

As shown by the discussion of the FIGS. 1, 4b, and 5, functions related to receiving a data message from an M2M device 13c and communicating the message with an application server 26 may also involve an appropriately configured mobile device 21. In this regard, it may be useful to consider the functional elements/aspects of an exemplary mobile device, at a high-level. For purposes of such a discussion, FIG. 6 provides a block diagram illustration of an exemplary mobile device 621. Although the mobile device 621 may be a handset type mobile phone or may be incorporated into another device, such as a personal digital assistant (PDA), a tablet computer, an appliance, a vehicle, etc., for discussion purposes, the illustration shows the mobile device 621 in the form of a handheld smart-phone. The smart-phone example of the mobile device 621 may function as a normal digital wireless telephone station. For that function, the mobile device 621 includes a microphone 102 for audio signal input and a speaker 104 for audio signal output. The microphone 102 and speaker 104 connect to voice coding and decoding circuitry (vocoder) 606. For a voice telephone call, for example, the vocoder 106 provides two-way conversion between analog audio signals representing speech or other audio and digital samples at a compressed bit rate compatible with the digital protocol of wireless telephone network communications through mobile communication network 15 and possibly voice over packet (Internet Protocol) communications if supported by the mobile device 621 and the data services through the mobile communication network 15.

For digital wireless communications, the mobile device 621 also includes at least one digital transceiver (XCVR) 608. The transceiver (XCVR) 608 could be a multimode transceiver, or the mobile device 621 may include two or more transceivers each of which supports a subset of the various technologies or modes. The concepts discussed here encompass examples of the mobile device 621 utilizing any digital transceivers that conform to current or future developed digital wireless communication standards.

The transceiver 608 provides two-way wireless communication of information, such as vocoded speech samples and/or digital message information, in accordance with the technology of the mobile communication network 15. In this case, the transceiver 608 also sends and receives a variety of signaling messages in support of the various voice and data services provided via the mobile device 621 and the communication network 15. Each transceiver 608 connects through RF send and receive amplifiers (not separately shown) to an antenna (e.g., 110). In the example, the transceiver 608 is configured for RF communication in accord with a digital wireless protocol, such as the current CDMA and 3GPP protocols.

In one example, the mobile device 621 also includes a short range wireless transceiver 622 (e.g., compatible with DECT, NFC, ZigBee, or Bluetooth). Accordingly, the short range wireless transceiver 622 provides two-way wireless communication with an appropriately configured M2M device (e.g., 24c). In this example, the short range wireless transceiver 622 is connected to an antenna 624, which is used for transmitting and receiving communications to/from an M2M device 24c, among other compatible devices.

In one example, the mobile device 621 includes a display 122 for displaying messages, call related information dialed by the user, calling party numbers, etc. The mobile device 621 also includes a touch/position sensor 126. The sensor 126 is relatively transparent, so that the user may view the information presented on the user interface (i.e., display) 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

In one example, the mobile device 621 also includes a GPS receiver 447 for communicating with satellites 20 via antenna 449. The GPS receiver 447 locates a plurality of satellites, determines the distance to each, and uses this information to deduce its own location. For example, the simple mathematical principle of trilateration is used to determine the location information of the mobile device 621.

In the example, a microprocessor 112 serves as a programmable controller or processor, in that it controls all operations of the mobile device 621 in accord with programming that it executes, for all normal operations, and for operations involved in selecting product/service from a menu and sending selection information to the application server 26 under consideration here. In the example, the mobile device 621 includes flash type program memory 114, for storage of various "software" or "firmware" program routines and mobile configuration settings, such as mobile telephone number (MTN or MDN), etc. In one example, the mobile device 621 has programming (e.g., an application) stored in its memory 114 that configures the mobile device 621 to perform various functions, including communicating with an M2M device 13, extracting a data message based on sensor information from the M2M device 13, communicating the data message to the application server 26 through the mobile communication network 15, and receiving confirmation messages from the application server 26. Thus, the mobile device 621 may have an application loaded to its flash memory 114 to provide the functions described herein.

The mobile device 621 may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. Accordingly, the mobile device 621 includes a processor, and programming stored in the flash memory 114 configures the processor so that the mobile device 621 is capable of performing various desired functions, including receiving information from an M2M device, sending information to an application server 26, receiving confirmations from the application server 26, and sending selection information to the application server.

As shown by the above discussion, functions for processing information provided by one or more sensors may be implemented on computers connected for data communication via the components of a packet data network, operating as the application server 26, customer account web server 43, service/vendor server 55, M2M device 13 and/or mobile device 21 as shown in FIG. 1. Although special purpose devices may be used, such devices also may be implemented using one or more hardware platforms intended to represent a general class of data processing device commonly used to run "server" programming so as to implement the machine health monitoring functions discussed above, albeit with an appropriate network connection for data communication.

Figure 7:
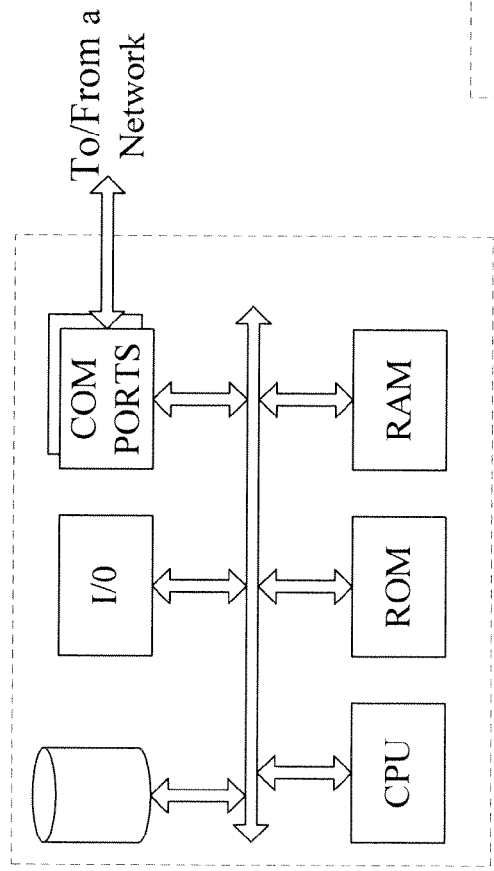
FIG. 7 illustrates a network or host computer.
Figure 8:
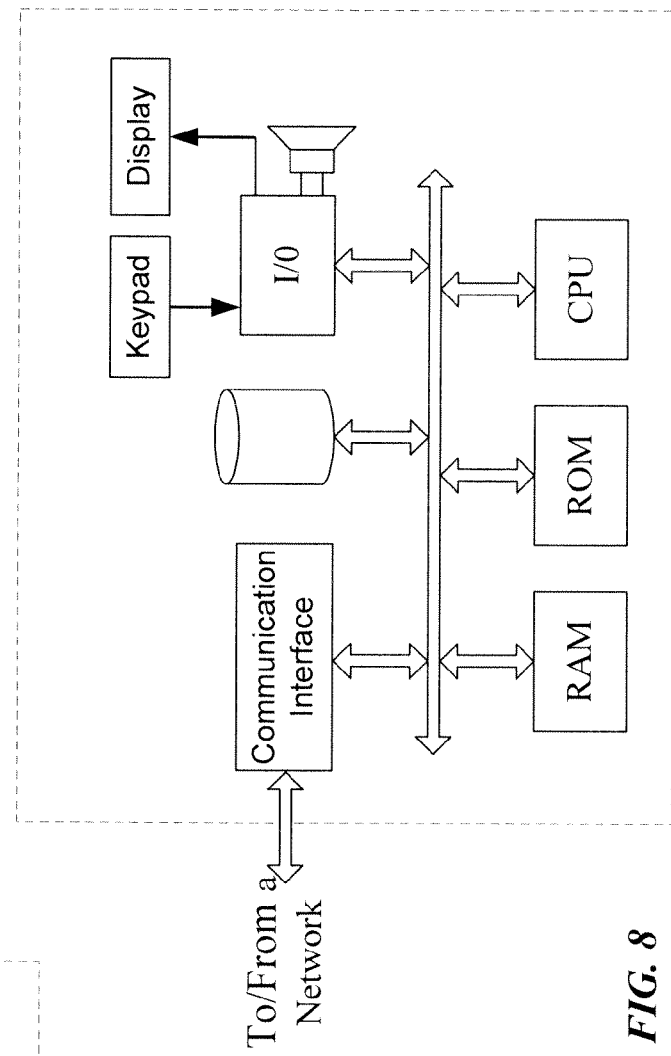
FIG. 8 depicts a computer with user interface elements.

FIGS. 7 and 8 provide functional block diagram illustrations of general purpose computer hardware platforms. FIG. 7 illustrates a network or host computer platform, as may typically be used to implement a server. FIG. 8 depicts a device with user interface elements, as may be used to implement a personal computer or workstation discussed herein, although the device of FIG. 8 may also act as a server if appropriately programmed. It is believed that the general structure and general operation of such equipment as shown in FIGS. 7 and 8 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run, for example, application server(s) 26 and customer account web server(s) 43 in FIG. 1.

A user terminal such as a general-purpose personal computer comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g., files used for the user applications on a mobile device to communicate with an M2M device or for an M2M device to gather sensor information discussed herein. The software code is executable by the M2M device or mobile device, accordingly. In operation, the code is stored, for example, within the M2M device. At other times, however, the software may be stored at other locations and/or transported for loading into the appropriate M2M device. Execution of such code by a processor of the M2M device enables the M2M device to implement respective aspects of the machine monitoring, in essentially the manner performed in the implementations discussed and illustrated herein. In other embodiments, the software may be stored at the mobile device or application server, which reads sensor information from the respective M2M devices.

Hence, aspects of the methods of remote utility monitoring outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

3GPP—Third Generation Partnership Project
3GPP2—Third Generation Partnership Project 2
BS—Base Station
BTS—Base Transceiver Station
CDMA—Code Division Multiple Access
CPU—Central Processing Unit
DECT—Digital Enhanced Cordless Telecommunications
DTC—Diagnostic Trouble Code
ECU—Engine Control Unit
ECT—Engine Coolant Temperature
EEPROM—Electrically Erasable Programmable Read Only Memory
EPROM—Erasable Programmable Read Only Memory
MAF—Mass Air Flow
GPS—Global Positioning System
GSM—Global System for Mobile Communications
HLR—Home Location Register
IEEE—Institute of Electrical and Electronic Engineers
IC—Integrated Circuit
IP—Internet Protocol
LAN—Local Area Network
LTE—Long Term Evolution
M2M—Machine to Machine
MCU—Micro Control Unit MDN—Mobile Directory Number
MID—Machine Identification Number
MIL—Malfunction Indicator Light
MIN—Mobile Identification Number
MTN—Mobile Telephone Number
NFC—Near Field Communication
OBD—On Board Diagnostic
OBD-II—On Board Diagnostic II
PC—Personal Computer
PDA—Personal Digital Assistant
PDN—Public Data Network PROM Programmable Read Only Memory
PSTN—Public Switched Telephone Network
QR—Quick Response
RAM—Random Access Memory
RAN—Radio Access Network
ROM—Read Only Memory
RF—Radio Frequency
SCP—Service Control Point
SMS—Short Message Service
SMSC—Short Message Service Center
UMTS—Universal Mobile Telecommunications System
WAN—Wide Area Network
XCVR—Transceiver

What is claimed is:

1. A method comprising steps of:
receiving at an application server a data message from a machine-to-machine (M2M) device over a mobile communication network, wherein the data message includes:
both (i) a Machine Identification (MID) number of a machine coupled to the M2M device and (ii) an identifier of the M2M device;
location information of the machine; and
an alert based on a condition of the machine, sensed by one or more sensors, satisfying a service or alarm criterion;
wherein the received data message is received in response to the M2M device determining that an acknowledgment message in response to a sent data message is not received within a first predetermined time, and sending a similar new message after a second predetermined time, wherein the second predetermined time varies based on severity of the condition of the machine and a type of the machine;
identifying an account based on the MID and the identifier of the M2M device received at the application server via the data message by correlating the MID of the machine coupled to the M2M device with subscription information stored in a database;
searching the database associated with the application server for one or more possible solutions for the machine satisfying the service or alarm criterion;
for each solution, matching the machine with one or more providers that can service the machine;
creating a tailored response data message based on:
the received location information of the machine;
the condition of the machine satisfying the service or alarm criterion;
the one or more possible solutions; and
the one or more matched providers; and
sending to a user of the machine the tailored response data message.

2. The method of claim 1, wherein matching the machine with one or more providers comprises selecting one or more providers that:
(a) can service the identified condition of the machine satisfying a service or alarm criterion; and
(b) are within a predetermined distance from the location of the machine.

3. The method of claim 2, wherein matching the machine with one or more providers further comprises:
determining whether the condition satisfying the service or alarm criterion relates to a recall; and
if there are several matched providers, narrowing the providers to one or more authorized to deal with the recall.

4. The method of claim 1, wherein the tailored response data message includes at least one of:
(a) one or more solutions to address the identified condition;
(b) a cost charged by each of the one or more providers;
(c) an average cost for each solution;
(d) a recommended solution;
(e) a distance to each of the one or more providers;
(f) a time it takes to service the condition of the machine satisfying the service or alarm criterion for each of the one or more providers;
(g) an average time it takes to service the condition of the machine satisfying the service or alarm criterion for each solution; or
(h) a rating of each of the one or more providers.

5. The method of claim 1, wherein the data message is received from the M2M device through the mobile communication network as a short messaging service (SMS) message.

6. The method of claim 1, wherein the location information is provided by at least one of:
(a) a global positioning system (GPS) receiver of the machine;
(b) a GPS receiver of the M2M device; or
(c) a GPS receiver of a mobile device coupled to the M2M device.

7. The method of claim 1, wherein the received location information comprises an address stored in a memory of the machine, M2M device, or account information associated with the MID or the identifier of the M2M device.

8. The method of claim 1, further comprising maintaining the database of the application server by updating information from one or more providers by electronically gathering information from at least one of a web-site or service server of each provider respectively.

9. The method of claim 8, wherein the updated information from each provider includes at least one of:
(a) services or products provided;
(b) a cost for each service or product;
(c) a time for each service or product; and
(d) schedule availability to perform the service.

10. The method of claim 8, wherein the information is updated:
(a) for one or more providers periodically; or
(b) for a provider upon receiving a notification from the provider that a change in its information has occurred.

11. The method of claim 1, further comprising updating the information for the matched one or more providers that can service the condition of the machine satisfying the service or alarm criterion, upon receiving the data message from the M2M device.

12. The method of claim 1, further comprising displaying content of the tailored response data message on a display of at least one of:
(a) the machine; or
(b) a mobile device coupled to the machine.

13. The method of claim 1, further comprising sending an acknowledgment to the M2M device that the data message is received at the application server.

14. A method comprising steps of:
   receiving condition information of a machine from one or more sensors;
   upon determining that the condition of the machine satisfies a service or alarm criterion, sending to an application server a data message over a mobile communication network, the message comprising:
      at least one of (i) a Machine Identification (MID) number of the machine or (ii) an identifier of the M2M device;
      location information of the machine; and
      an alert based on a condition of the machine satisfying the service or alarm criterion;
   upon determining that an acknowledgment message in response to the sent data message is not received within a first predetermined time, sending a similar new message to the application server after a second predetermined time, wherein the second predetermined time varies based on severity of the condition of the machine and a type of the machine;
   receiving a tailored response data message from the application server, the tailored message including:
      one or more possible solutions to the condition of the machine satisfying the service or alarm criterion; and
      for each solution, one or more matched providers to service the condition of the machine satisfying the service or alarm criterion.

15. The method of claim 14, wherein the data message is sent through the mobile communication network as a short messaging service (SMS) message.

16. The method of claim 14, wherein the data message is sent to the application server over the mobile communication network via a mobile device coupled to the M2M device.

17. The method of claim 16, wherein the M2M device is coupled to the mobile device by at least one of:
   (a) mechanically via a docking station;
   (b) wirelessly through a short range wireless technology.

18. The method of claim 14, further comprising displaying content of the tailored response data message on a display of the M2M device.

19. A machine to machine (M2M) device comprising:
   a processor;
   a communication interface coupled to the processor;
   a storage device for content and programming;
   a program stored in the storage device, wherein execution of the program by the processor configures the M2M device to perform functions, including functions to:
      receive condition information of a machine from one or more sensors;
      upon determining that the condition of the machine satisfies a service or alarm criterion, send to an application server a data message over a mobile communication network, the message comprising:
         at least one of (i) a Machine Identification (MID) number of the machine or (ii) an identifier of the M2M device;
         location information of the machine; and
         an alert based on a condition of the machine satisfying the service or alarm criterion;
      upon determining that an acknowledgment message in response to the sent data message is not received within a first predetermined time, send a similar new message to the application server after a second predetermined time, wherein the second predetermined time varies based on severity of the condition of the machine and a type of the machine;
      receive a tailored response data message from the application server, the tailored message including:
         one or more possible solutions to the condition of the machine satisfying the service or alarm criterion; and
         one or more matched providers to service the condition of the machine satisfying the service or alarm criterion.

20. The M2M device of claim 19, wherein execution of the program by the processor further configures the M2M device to perform functions to send the data message through a mobile communication network as a short messaging service (SMS) message.

21. The M2M device of claim 19, wherein execution of the program by the processor further configures the M2M device to perform functions to send the data message to the application server over a mobile communication network via a mobile device coupled to the M2M device.

22. The M2M device of claim 21, wherein the M2M device is coupled to the mobile device by at least one of:
   (a) mechanically via a docking station;
   (b) wirelessly through a short range wireless technology.

23. The M2M device of claim 19, wherein execution of the program by the processor further configures the M2M device to perform functions to display content of the tailored response data message on a display of the M2M device.

* * * * *